(12) United States Patent
Grimm et al.

(10) Patent No.: US 7,748,224 B2
(45) Date of Patent: Jul. 6, 2010

(54) AIR-CONDITIONING ASSEMBLY

(75) Inventors: Mark Thomas Grimm, Dunlap, IL (US); Ryan Patrick McEnaney, Peoria, IL (US); Danette E. Hadfield, Low Point, IL (US); Aaron F. Clay, Chillicothe, IL (US); Ronald R. Gustin, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 660 days.

(21) Appl. No.: 10/974,809

(22) Filed: Oct. 28, 2004

(65) Prior Publication Data

US 2006/0090490 A1    May 4, 2006

(51) Int. Cl.
*F25D 17/00* (2006.01)
*G01D 21/00* (2006.01)
*G01K 1/08* (2006.01)

(52) U.S. Cl. .......................... 62/181; 73/866.5; 374/209

(58) Field of Classification Search .................... 62/181, 62/228.1; 374/147, 193, 194, 197, 208, 209; 73/493, 756, 866.5; 248/229.15
See application file for complete search history.

(56) References Cited

U.S. PATENT DOCUMENTS

| | | | | |
|---|---|---|---|---|
| 3,546,942 | A | * 12/1970 | Thiele | .......................... 374/194 |
| 3,901,480 | A | * 8/1975 | Basile et al. | .................... 256/32 |
| 4,297,668 | A | 10/1981 | Place | |
| 4,561,260 | A | 12/1985 | Nishi et al. | |
| 4,578,960 | A | 4/1986 | Nishi et al. | |
| 4,738,737 | A | * 4/1988 | Runde et al. | ................... 156/91 |
| 4,971,452 | A | * 11/1990 | Finney | ......................... 374/208 |
| 5,072,597 | A | * 12/1991 | Bromley et al. | ................ 62/209 |
| 5,099,654 | A | 3/1992 | Baruschke et al. | |
| 5,669,226 | A | 9/1997 | Kurahashi et al. | |
| 5,707,151 | A | 1/1998 | Parker et al. | |
| 6,073,459 | A | 6/2000 | Iritani | |
| 6,158,886 | A | * 12/2000 | Dutcher et al. | .............. 374/179 |
| 6,546,823 | B1 | 4/2003 | Veit | |
| 6,558,036 | B2 | * 5/2003 | Gysling et al. | .............. 374/147 |
| 6,578,373 | B1 | * 6/2003 | Barbier | ......................... 62/158 |
| 2001/0053172 | A1 | * 12/2001 | Sakowsky et al. | ........... 374/147 |
| 2002/0041621 | A1 | * 4/2002 | Faries et al. | .................. 374/147 |
| 2004/0084984 | A1 | 5/2004 | Yanashima et al. | |
| 2004/0173721 | A1 | * 9/2004 | Kahan | ......................... 248/314 |

FOREIGN PATENT DOCUMENTS

| | | | |
|---|---|---|---|
| DE | 10136738 A1 | * | 2/2003 |
| EP | 0 392 774 A2 | | 10/1990 |
| EP | 1 246 348 A2 | | 10/2002 |
| JP | 06003300 A | * | 1/1994 |
| JP | 7-266857 | | 10/1995 |

* cited by examiner

*Primary Examiner*—Chen-Wen Jiang
(74) *Attorney, Agent, or Firm*—Finnegan, Henderson, Farabow & Garrett, Dunner

(57) ABSTRACT

A temperature sensing assembly for monitoring a temperature of a pipe in a system. The temperature sensing assembly includes an insulator body having a first end, a second end, an outer surface, and an inner surface. The outer and inner surfaces extend between the first and second ends. The inner surface is configured to receive a portion of the pipe. A temperature sensor is disposed adjacent the inner surface and is configured to directly contact the pipe when the pipe is received by the inner surface.

27 Claims, 4 Drawing Sheets

AIR-CONDITIONING ASSEMBLY

TECHNICAL FIELD

This disclosure is directed to an air-conditioning assembly and, more particularly, to an air-conditioning assembly including a temperature sensing assembly.

BACKGROUND

A typical air-conditioning system includes temperature and/or pressure sensors placed within its plumbing to detect the temperature and/or pressure of a refrigerant in the system. In order to place the sensors, holes may be formed in the plumbing, the sensors may be inserted through the holes, and then the holes may be sealed to minimize the escape of the refrigerant from the system. The plumbing may be formed of flexible hoses extending between system components. In a mobile application, the air-conditioning system may include a belt-driven input shaft. O-rings, seals at connections or about the shaft, and/or other sealants are provided in order to contain the refrigerant within the system.

However, over time, the refrigerant may permeate through the flexible hoses, seals, and/or O-rings, escaping into the atmosphere and decreasing the operating efficiency of the air-conditioning system. To reduce the permeation, hermetically sealed air-conditioning systems use hard plumbing or metal pipe plumbing in place of the flexible hoses. Further, each joint or connection is welded or brazed so that seals and sealants are not necessary in the system.

On hermetically sealed systems, the temperature sensors may be placed within the system plumbing through mechanical joints. Accordingly, the temperature of the refrigerant may still be monitored. However, even still, these mechanical joints are potential leak paths of the refrigerant from the air-conditioning system.

One system that allows temperature reading from the exterior of a pipe is disclosed in U.S. Pat. No. 5,707,151 to Parker et al. The '151 patent discloses a temperature transducer assembly that may be used on a heat exchanger. The transducer assembly includes a housing, a signal producing assembly, and a mounting structure. The housing and mounting structure attach the signal producing assembly to a flow tube surface. However, the housing includes a wall section that separates the sensor from the tube. Accordingly, readings of the sensor may be slightly distorted. In addition, the transducer assembly may include more components than is necessary, rendering manufacturing of the transducer assembly more complex than is necessary.

This disclosure is directed to an air-conditioning assembly with a temperature sensing assembly that overcomes one or more of the deficiencies in the prior art.

SUMMARY OF THE INVENTION

In one exemplary aspect, a temperature sensing assembly for monitoring a temperature of a pipe in a system is disclosed. The temperature sensing assembly includes an insulator body having a first end, a second end, an outer surface, and an inner surface. The outer and inner surfaces extend between the first and second ends. The inner surface is configured to receive a portion of the pipe. A temperature sensor is disposed adjacent the inner surface and is configured to directly contact the pipe when the pipe is received by the inner surface.

In another exemplary aspect, a hermetically sealed air-conditioning assembly is disclosed. The air-conditioning assembly includes a compressor and a compressor outlet pipe extending from the compressor. It also includes a condenser connected to the compressor outlet pipe and a condenser outlet pipe extending from the condenser. A condenser fan is configured to generate airflow through the condenser. At least one temperature sensing assembly is disposed on at least one of the compressor and condenser outlet pipes. The at least one temperature sensing assembly includes an insulator body having a first end, a second end, an outer surface, and an inner surface. The outer and inner surfaces extend between the first and second ends. The inner surface is configured to receive a portion of the at least one of the compressor and condenser outlet pipes. A temperature sensor is disposed adjacent the inner surface and is configured to directly contact the at least one of the compressor and condenser outlet pipes when the portion of the at least one of the compressor and condenser outlet pipes is received by the inner surface. The temperature sensor is configured to communicate a temperature signal indicative of a temperature of the at least one of the compressor and condenser outlet pipes. A control module is in communication with the at least one temperature sensing assembly, the compressor, and the condenser fan. The control module is configured to receive the temperature signal, generate a control signal based upon the temperature signal, and communicate the control signal to at least one of the compressor and the condenser fan.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

Figure 1:
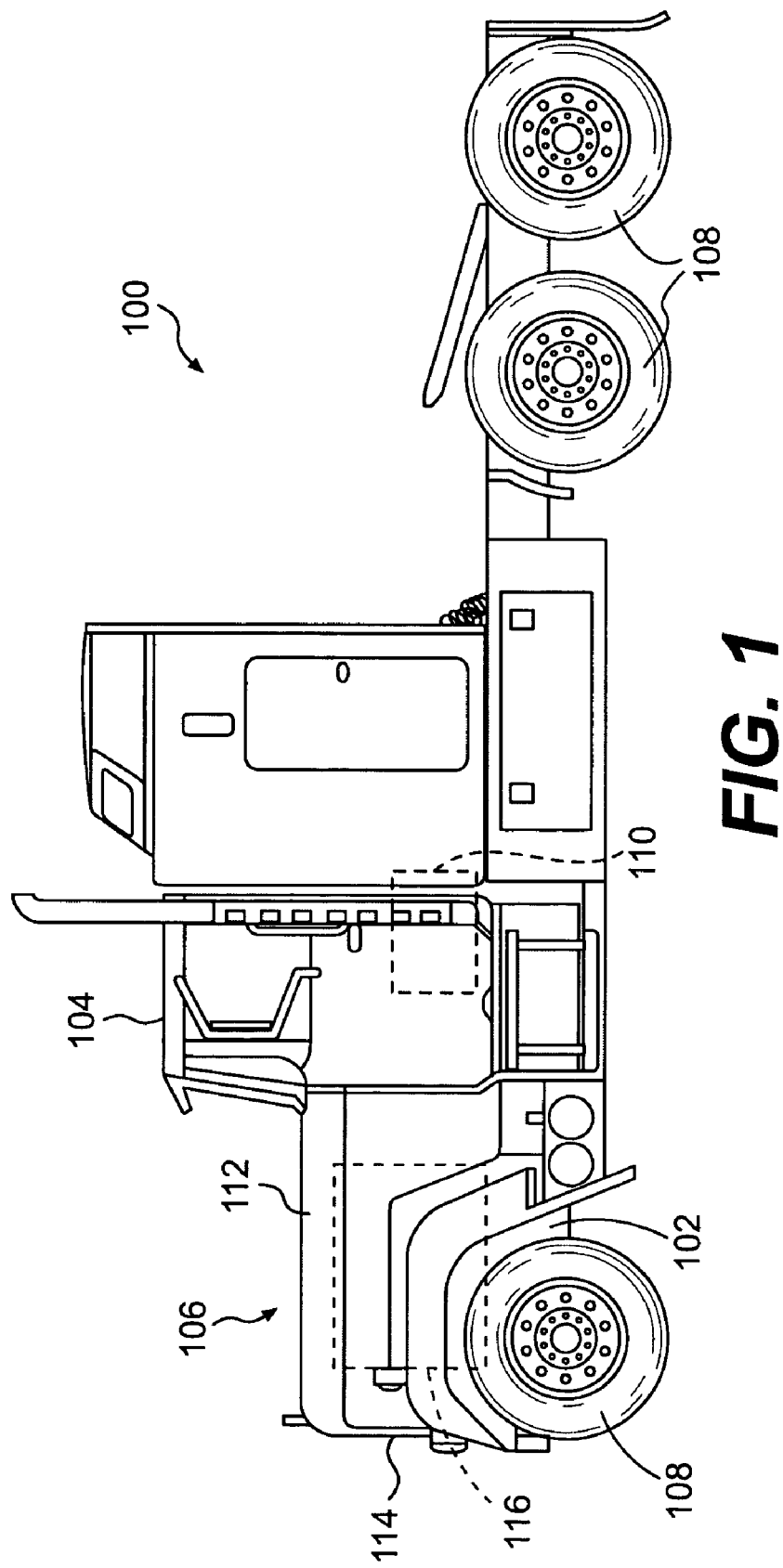
FIG. 1 is a pictorial representation of an exemplary embodiment of a vehicle including an air-conditioning assembly.

An exemplary embodiment of an on-highway vehicle 100 is illustrated in FIG. 1. Although the vehicle 100 is shown as an on-highway truck, it could be an off-highway truck or other vehicle. In the exemplary embodiment shown, the vehicle 100 includes a frame 102, an operator compartment 104, a propulsion system housing 106, wheels 108, and an air-conditioning assembly 110. The frame 102 may support the operator compartment 104 and the propulsion system housing 106, which in turn, may itself be supported by the wheels 108.

The propulsion system housing 106 may include a hood 112 and a grill 114. An engine 116 and/or other driving components may be contained within the propulsion system housing 106, supported on the frame 102, and may provide power to drive the wheels 108.

The air-conditioning assembly 110 may be disposed in any convenient location on the work machine 100 but, in this exemplary embodiment, is shown as being contained within the operator compartment 104. Further, the air-conditioning assembly 110 may be disposed below an operator seat or in alternate locations. The air-conditioning assembly 110 is designed to provide air-conditioned airflow to the operator compartment 104.

Figure 2:
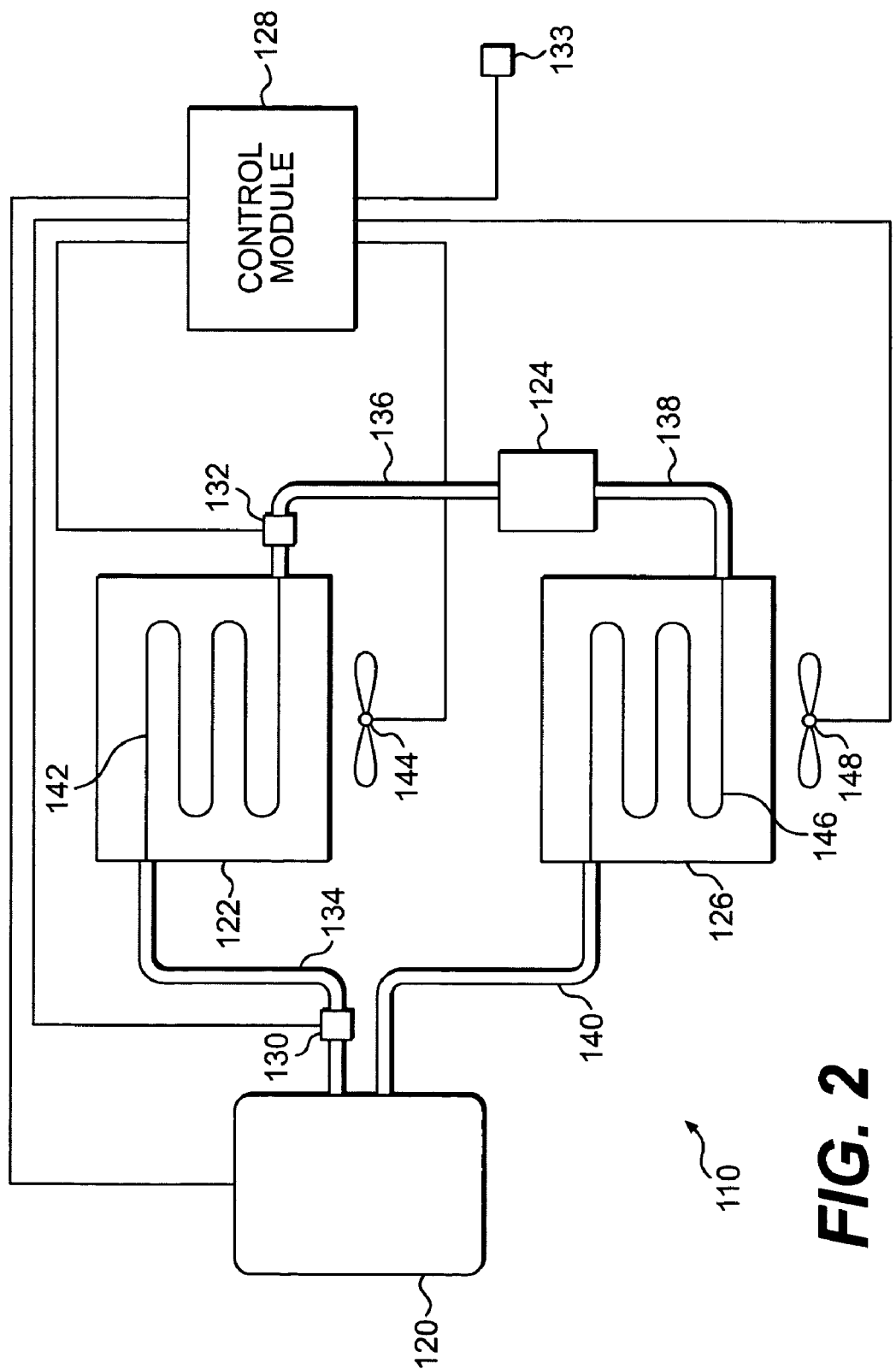
FIG. 2 is a schematic showing a hermetically sealed air-conditioning assembly.

FIG. 2 shows the air-conditioning assembly 110 in greater detail. The air-conditioning assembly 110 includes conditioning components and control components. The conditioning components include a compressor 120, a condenser 122, an expansion valve 124, and an evaporator 126. The control components include a control module 128, a compressor temperature sensing assembly 130, a condenser temperature sensing assembly 132, and an ambient temperature sensor 133.

The air-conditioning assembly 110 may be a self-contained, hermetically sealed system, including hard tubing between each of the various conditioning components. The hard tubing may be formed of metal pipes and may be brazed or welded at connections, providing a completely contained system. For purposes of this description, the hard tubing between the components will be referred to herein as a compressor outlet pipe 134, a condenser outlet pipe 136, an expansion valve outlet pipe 138, and an evaporator outlet pipe 140.

Referring to FIG. 2, the compressor 120 may be any standard air-conditioning compressor configured to increase the pressure of refrigerant, thereby increasing the temperature of the refrigerant in order to output the refrigerant as a high-temperature, high-pressure vapor. In one exemplary embodiment, the compressor 120 is an electrically powered compressor that may operate on AC power. However, the compressor 120 could be powered using any known means.

The condenser 122 is configured to dissipate heat from the high pressure refrigerant in a manner known in the art. The condenser 122 may include coils 142 and a condenser fan 144. The condenser fan 144 may be configured to push air across the coils 142 to remove the heat from the refrigerant so that the refrigerant condenses from a vapor to a relatively lower temperature high-pressure liquid. The expansion valve 124 may be configured to expand the high pressure liquid into a cold, low pressure vapor or liquid/vapor.

The evaporator 126 may include evaporator coils 146 and an evaporator fan 148. The evaporator fan 148 may be configured to push air across the coils 146 to transfer heat from the air to the refrigerant, thereby cooling the air and increasing the temperature of the refrigerant. After passing through the evaporator 126, the cooled air may be directed into the operator compartment 104 of FIG. 1, while the refrigerant is circulated to the compressor 120.

As stated above, the control components include the control module 128, the compressor temperature sensing assembly 130, the condenser temperature sensing assembly 132, and the ambient temperature sensor 133. The temperature sensing assemblies 130, 132 and the ambient temperature sensor 133 will be described first, followed by the control module 128.

In order to maintain the integrity of the hermetically sealed air-conditioning assembly 110, the compressor and condenser temperature sensing assemblies 130, 132 may be configured to measure temperatures of the refrigerant in the system from a location outside the components of the system. In this exemplary embodiment, the compressor temperature sensing assembly 130 may be disposed at an outlet from the compressor 120 on the compressor outlet pipe 134, and the condenser temperature sensing assembly 130 may be disposed at an outlet from the condenser 122 on the condenser outlet pipe 134. As refrigerant exits the compressor 120 and the condenser 122, and enters the respective outlet pipe 134, 136, the temperature of the pipe may be measured by the respective compressor and condenser temperature sensing assemblies 130, 132. This temperature may be indicative of the temperature of the actual refrigerant. Thus, this is an indirect measurement of the refrigerant temperature.

Figure 3:
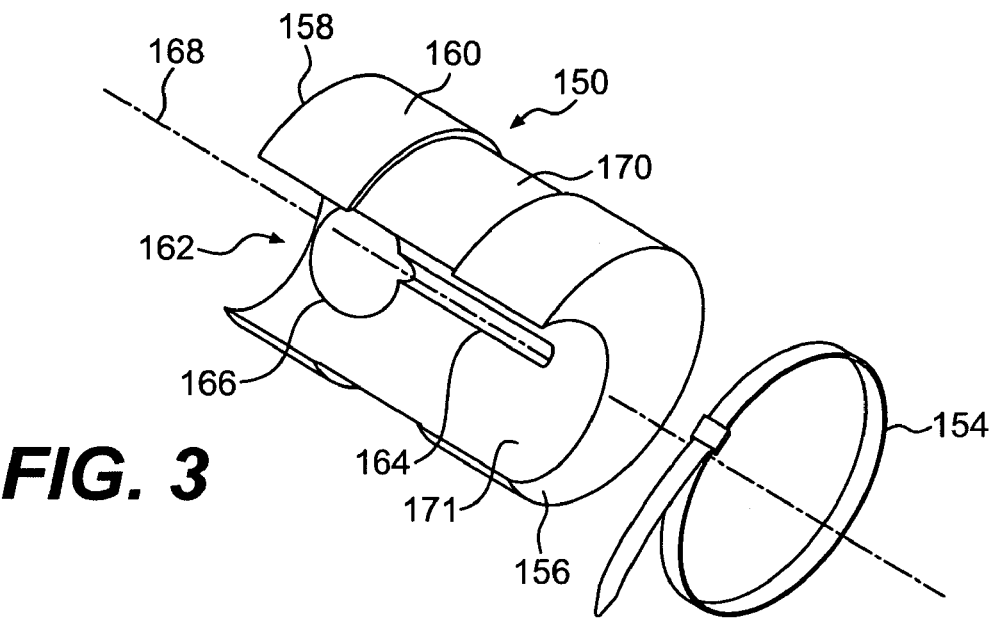
FIG. 3 is a pictorial isometric view of an exemplary temperature sensing assembly.
Figure 4:
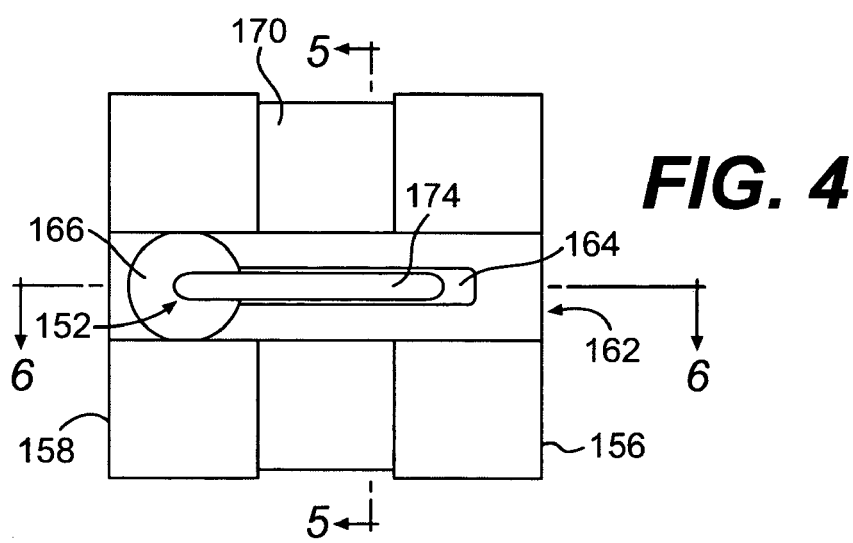
FIG. 4 is a pictorial side view of the temperature sensing assembly of FIG. 3.
Figure 5:
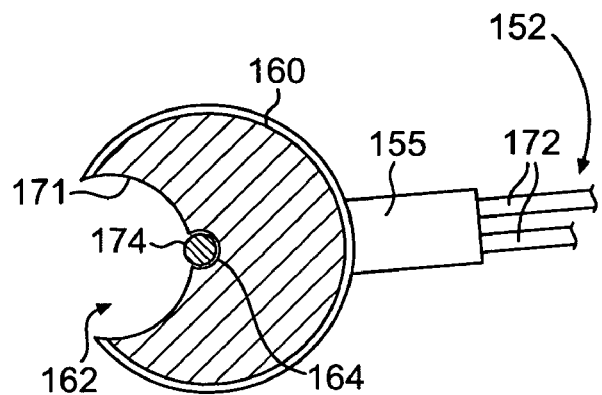
FIG. 5 is a pictorial cross-sectional view taken along lines 5-5 of FIG. 4.
Figure 6:
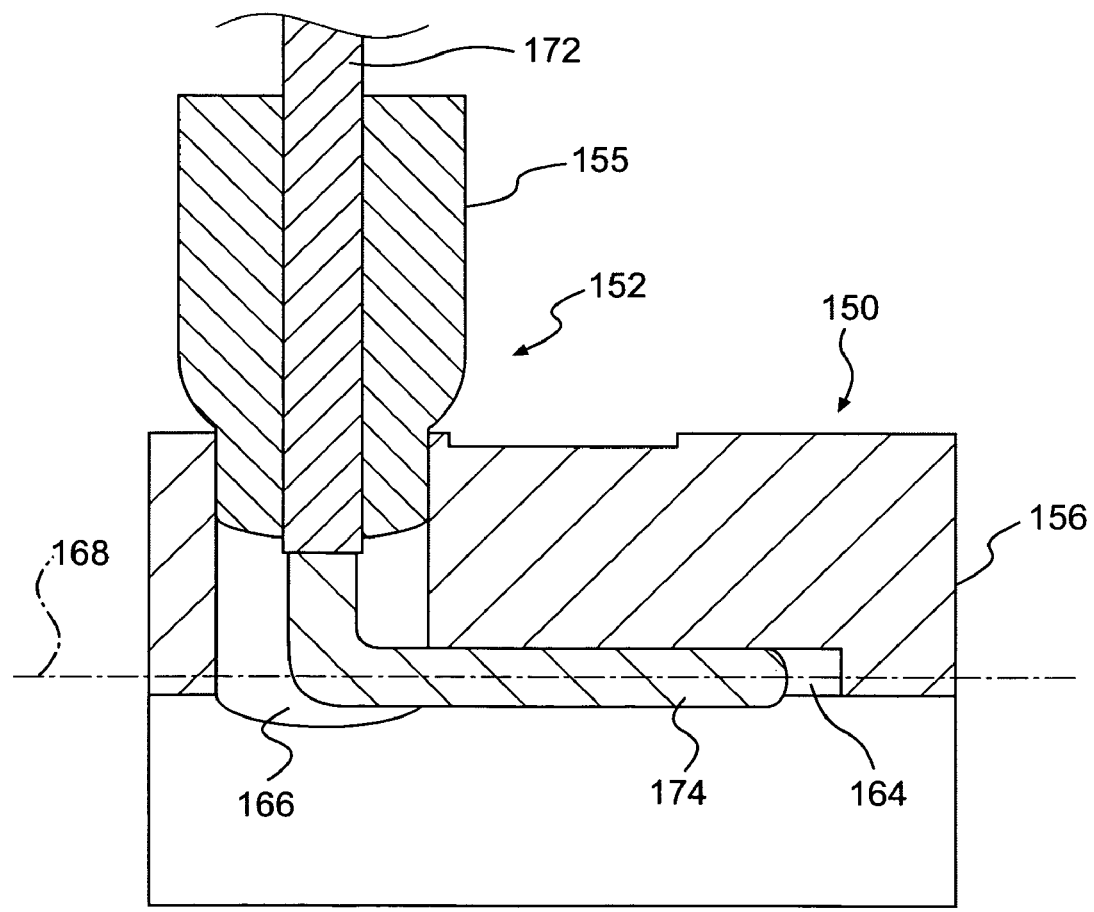
FIG. 6 is a pictorial cross-sectional view taken along lines 6-6 of FIG. 4.

One exemplary embodiment of the compressor and condenser temperature sensing assemblies 130, 132 is shown in FIGS. 3-6. The temperature sensing assemblies 130, 132 may each include an insulator body 150, a sensor 152, a strap 154, and a wire seal 155. FIG. 3 is an isometric view of the insulator body 150 and the strap 154, FIG. 4 is an side view of the insulator body 150 with the sensor 152 in place, FIG. 5 is a cross-sectional view of the insulator body 150 and sensor 152 taken along lines 5-5 in FIG. 4, and FIG. 6 is a cross-sectional view of the insulator body 150 and sensor 152 taken along lines 6-6 in FIG. 4.

The insulator body 150 includes a first end 156, a second end 158, and an outer circumference 160. The insulator body 150 also includes a substantially concave recess 162, a depression 164, and a wire passage 166. A longitudinal axis 168 is shown extending through the insulator body 150 through the first and second ends 156, 158. The insulator body 150 may be formed of any insulating material, such as a rubber material and/or a foam polymer material that may insulate the sensor 152, as described below.

The outer circumference 160 of the insulator body 150 extends between and connects the first and second ends 156, 158. In the exemplary embodiment shown, the outer circumference 160 includes a waist 170 forming a region having a diameter less than the diameter of adjacent regions of the outer circumference 160. The waist 170 may provide a location where the strap 154 may securely wrap around the insulator body 150, while also limiting the ability of the strap 154 to inadvertently move axially along the outer circumference 160.

The concave recess 162 may be formed within the insulator body 150 and may be defined by an inner surface 171, such as a concave surface, extending from the first end 156 to the second end 158, and may be configured to receive a portion, such as a side or circumference, of the compressor or condenser outlet pipes 134, 136 shown in FIG. 2. It should be noted that the inner surface may define a recess or surface having a shape other than concave, such as rectangular, or other shape. When in place, the outlet pipes 134, 136 may be substantially parallel to the longitudinal axis 168. In one exemplary embodiment, the concave recess 162 is formed to have a radius corresponding to the radius of the outlet pipes 134, 136. In another exemplary embodiment, the concave recess 162 is formed to have a radius smaller than the radius of the outlet pipes 134, 136, and may be configured to elastically deform to receive the outlet pipe. In one exemplary embodiment, the concave recess 162 may extend into the outer circumference 160 of the insulator body 150 to a point generally adjacent the longitudinal axis 168.

The depression 164 may be a notch that may extend longitudinally within the inner surface 171 of the concave recess 162 and may be configured to be disposed substantially along the longitudinal axis, through the center of the insulator body 150. The depression 164 may be shorter than the length of the insulator body 150 so that it does not extend to either of the first and second ends 156, 158. Accordingly, when one of the outlet pipes 134, 136 is fit within the concave recess 162, ambient air may not pass into the depression 164 through its ends or between the outlet pipe and the concave recess 162. In use, the sensor 152 may be configured to fit within the depression 164, adjacent any outlet pipe 134, 136 within the concave recess 162.

The wire passage 166 may extend radially from the concave recess 162, through the insulator body 150, providing an opening (not shown) in the outer circumference 160. The wire passage 166 may be adjacent to the depression 164 and may be configured to connect to the depression 164. In use, the sensor 152 may extend through the wire passage into the depression 164.

The strap 154 may be configured to fit around the insulator body 150 and the associated outlet pipe to securely hold the concave recess 162 of the insulator body 150 against the outlet pipe. In one exemplary embodiment, the strap 154 may extend around the waist 170 of the insulator body 150 and may be adjustable to be tightened for secure attachment. The strap 154 could be a belt, wire, and/or other attachment means known in the art. In one exemplary embodiment, the strap 154 is a zip-tie strap that may be tightened to secure the insulator body 150 to the pipe.

The sensor 152, shown in place on the insulator body 150 in FIGS. 4-6, may include a wire 172 and a probe 174. The wire 172 may extend from the wire passage 166 to the control module 128 of FIG. 2. The probe 174 may extend from the wire passage 166, include a bend at about a ninety degree angle, and extend along the depression 164, so that, in the depression 164, the probe is substantially parallel to the longitudinal axis 168. As best seen in FIGS. 5 and 6, the probe 174 may be slightly larger than a depth of the depression 164 and, therefore, may slightly protrude from the depression 164 into the concave recess 162. Accordingly, when the outlet pipes 134, 136 are disposed in the concave recess 162, the probe 174 may directly contact the exterior of the outlet pipe 134, 136. The probe 174 may be configured to measure the temperature of the outlet pipe 134, 136 and communicate a temperature signal indicative of a measured temperature to the control module 128 through the wires 172.

The wire seal 155 is shown in FIGS. 5 and 6 and may be disposed at least partially in the wire passage 166 to seal and insulate the wire passage 166 from ambient air. The wire seal 155 may have a diameter similar to or slightly larger than the wire passage 166, thereby forming an interference fit. In addition, the wire seal 155 may be formed so that the wires 172 may pass through the wire seal 155, with the wire seal being configured to seal around each wire 172. In the exemplary embodiment shown, the wire seal 155 protrudes from the wire passage 166 for a short distance, sealing around the wires 172. The wire seal 155 may be formed of the same material as the insulator body 150 or, alternatively, may be formed of a different insulating material.

Returning to FIG. 2, the ambient temperature sensor 133 may be any sensor configured to measure an air temperature and may be disposed at a location allowing it to measure the temperature of ambient air, away from the compressor components. The ambient temperature sensor 133 may be in communication with the control module 128 and may be configured to communicate a temperature signal indicative of the measured temperature to the control module 128.

The control module 128 may include a processor and a memory component and may be in electrical communication with the compressor 120, the condenser fan 144, the evaporator fan 148, the compressor and condenser temperature sensing assemblies 130, 132, and the ambient temperature sensor 133. The control module 128 may be configured to receive temperature signals from the compressor and condenser temperature sensing assemblies 130, 132 indicative of the temperatures of the compressor and condenser outlet pipes 134, 136. Based on the temperature signals, the control module 128 may be configured to determine the actual temperature of the refrigerant within the respective outlet pipes 134, 136. In addition, the control module 128 may be configured to receive a temperature signal from the ambient temperature sensor 133. Based on the temperature signals received, the control module 128 may be configured to generate control signals in order to control the compressor 120, the condenser fan 144, and the evaporator fan 148. For example, the control module 128 may generate control signals to increase or decrease the fan speeds of the condenser and evaporator fans 144, 148 and to control the operating speed of the compressor 120.

In one exemplary embodiment, the control module 128 is configured to monitor the temperature detected by the compressor temperature sensing assembly 130. If the measured temperature exceeds a preset threshold, the control module 128 may be configured to determine, based upon the measured refrigerant temperature, that the compressor 120 is too hot and may reduce the compressor speed to reduce the temperature of the refrigerant and the compressor 120. Accordingly, in one exemplary embodiment, the preset threshold temperature is based on a maximum, acceptable operating temperature of the compressor 120. If the refrigerant temperature continues to exceed the threshold, the control module 128 may be configured to shutdown operation of the compressor 120, thereby protecting the compressor 120 from overheating.

In another exemplary embodiment, the control module 128 may be configured to monitor the temperature signal from the ambient temperature sensor 133. Based on the ambient air temperature signal, the control module 128 may be configured to increase or reduce the compressor speed of the compressor 120. For example, if the ambient temperature sensor 133 detects that the ambient temperature is below a given threshold, the control module 128 may shut down the compressor 120.

In addition, the control module 128 may be configured to monitor the ambient air temperature and the condenser outlet pipe temperature to determine the airflow necessary to generate a desired air-conditioning temperature through the evaporator 126. For example, the condenser fan 144 may be controlled to provide airflow to cool the refrigerant in the condenser 122 to a desired temperature, which then directly affects the temperatures that may be achieved at the evaporator 126.

INDUSTRIAL APPLICABILITY

The temperature sensing assembly 130, 132 disclosed herein may be used to monitor and detect temperatures of a fluid in a pipe. In addition, it may be configured to isolate temperature detecting portions of a sensor, such as the probe 174, from external factors, such as ambient air, that may affect accuracy of the sensor. Such an assembly may be found useful for monitoring and detecting temperatures of a refrigerant in a pipe of an air-conditioning assembly, such as the air-conditioning assembly 110. Because the temperature sensing assembly is configured to connect to an exterior of the pipe, the air-conditioning assembly 110 may be hermetically sealed, yet still be properly controlled.

In the exemplary embodiment disclosed herein, the temperature sensing assemblies 130, 132 may be in communication with the control module 128 and may generate temperature signals indicative of a reading or measurement of a temperature of the associated pipe. Based on the temperature of the associated pipe, the control module 128 may be configured to determine the temperature of the refrigerant in the pipe.

In one exemplary embodiment, the temperature of the pipe may be monitored by maintaining the probe 174 of the sensor 152 within the depression 164 formed in the insulator body 150. The concave recess 162 receives a portion of the circumference of the associated outlet pipe so that the inner surface 171 is in contact with the pipe and forms a seal with the pipe to isolate the probe 174 from ambient air. The probe 174 may be in direct contact with the pipe, and may be configured to monitor the temperature of the pipe. The wire seal 155 may seal about the wires 172 and thus seal the wire passage 166 from entry of ambient air so that the temperature sensed by the probe 174 may be less likely to be influenced by ambient and other external temperatures. The sensor 152 may communicate a temperature signal indicative of a temperature of the pipe to the control module 128. The control module 128 may then generate and communicate a control signal based on the temperature signal to control the compressor 120 and/or at least one of the condenser and evaporator fans 144, 148.

In one exemplary embodiment, the control module 128 stores a threshold temperature for comparison to a temperature received from the compressor temperature sensing assembly 130. By comparing the signal from the compressor temperature sensing assembly 130 to the threshold temperature, the control module 128 monitors issues that may arise during operation of the air-conditioning system 110. For example, if the condenser fan 144 were to stop working, the temperature of refrigerant from the compressor 120 would increase and may exceed the threshold temperature. When such an increase occurs, the control module 128 may be configured to reduce the compressor speed and, if the temperature continues to exceed the threshold, may shutdown the compressor 120, thereby turning off the air-conditioning system 110. This may reduce the occurrence of overheating the compressor and may extend the life of the compressor.

In another exemplary embodiment, the control module 128 monitors the temperature signal from the ambient temperature sensor 133. The temperature signal may be compared to a stored temperature, and based on the comparison, the control module 128 may increase or reduce the compressor speed of the compressor 120. For example, if the ambient temperature sensor 133 detects that the ambient temperature is below a given threshold, the control module 128 may shut down the compressor 120 or not allow it to start operating. Such a system can be beneficial when the ambient temperature is already cold, and the ambient air may not effectively be further cooled by the air-conditioning system.

In yet another exemplary embodiment, the control module 128 monitors the ambient air temperature and the condenser outlet pipe temperature to determine the airflow necessary to generate a desired air-conditioning temperature through the evaporator 126. To do this, the control module 128 may receive the ambient temperature signal from the ambient temperature sensor 133 and the temperature signal from the condenser temperature sensing assembly 132. By comparing the temperatures from the signals, the control module 128 may generate a control signal to control the condenser fan 144 to increase or decrease the airflow to cool the refrigerant in the condenser 122 to a desired temperature, which then directly affects the temperatures that may be achieved at the evaporator 126.

Although the air-conditioning assembly 110 disclosed herein is shown as used on an on-highway work machine, it may be equally applicable to other vehicles, including off-highway work machines, tractors, and/or other vehicles. In addition, it is contemplated that the temperature sensing assembly disclosed herein may be used to monitor pipes other than air-conditioning pipes, and may be useful whenever monitoring a temperature from an exterior of the pipe is desired.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A temperature sensing assembly for monitoring a temperature of a pipe in a system, comprising:
    an insulator body including
        a first end, a second end, an outer surface, and an inner surface, the outer and inner surfaces extending between the first and second ends and forming a wall of continuously varying thickness as viewed in a cross section transverse to a longitudinal axis of the insulator body, wherein the outer and inner surfaces share two edges, and at least one of the outer surface and the inner surface is formed entirely of one or more curved surfaces, the inner surface including a depression formed therein and being configured to receive a portion of the pipe; and
    a temperature sensor disposed adjacent the inner surface and within the depression, the sensor including a probe adapted so that at least a portion of the probe protrudes from the depression, and the probe being configured to directly contact the pipe when the pipe is received by the inner surface.

2. The temperature sensing assembly of claim 1, wherein the depression is a longitudinal notch.

3. The temperature sensing assembly of claim 1, wherein the sensor further includes a sensor wire adapted to operatively connect the sensor to a control module.

4. The temperature sensing assembly of claim 1, wherein the inner surface defines a concave recess configured to receive the portion of the pipe.

5. The temperature sensing assembly of claim 1, wherein the insulator body includes a wire passage extending radially from the inner surface through the insulator body, the wire passage being configured to receive sensor wires, and the probe extending from the wire passage and along the depression to define a bend therebetween.

6. The temperature sensing assembly of claim 5, including a wire seal disposed within the wire passage to seal the temperature sensor from ambient air when the pipe is received by the inner surface.

7. The temperature sensing assembly of claim 1, including a strap configured to extend around the outer surface of the insulator body and the pipe to secure the pipe against the inner surface and in direct contact with the sensor.

8. The temperature sensing assembly of claim 7, wherein the strap is a zip-tie type strap.

9. The temperature sensing assembly of claim 7, wherein the insulator body includes a waist disposed between adjacent portions, the waist having a diameter less than a diameter of the adjacent portions, the strap being disposed about the waist.

10. The temperature sensing assembly of claim 1, wherein the inner surface defines a concave recess configured to have a smaller diameter than the pipe, and is configured to elastically deform to fit around the pipe.

11. A hermetically sealed air-conditioning assembly, comprising:
a compressor;
a compressor outlet pipe extending from the compressor;
a condenser connected to the compressor outlet pipe;
a condenser outlet pipe extending from the condenser;
a condenser fan configured to generate airflow through the condenser;
at least one temperature sensing assembly disposed on at least one of the compressor and condenser outlet pipes, said at least one temperature sensing assembly including an insulator body having
a first end, a second end, an outer surface, and a completely recessed inner surface, the outer and inner surfaces extending between the first and second ends, the inner surface defining a recess including a depression formed therein and being configured to receive only a portion of a perimeter of said at least one of the compressor and condenser outlet pipes; and
a temperature sensor disposed adjacent the inner surface and within the depression, the sensor including a probe adapted so that at least a portion of the probe protrudes from the depression, and the probe being configured to directly contact said at least one of the compressor and condenser outlet pipes when the portion of said at least one of the compressor and condenser outlet pipes is received by the inner surface, the temperature sensor being configured to communicate a temperature signal indicative of a temperature of said at least one of the compressor and condenser outlet pipes; and
a control module in communication with said at least one temperature sensing assembly, the compressor, and the condenser fan, the control module being configured to receive the temperature signal, generate a control signal based upon the temperature signal, and communicate the control signal to at least one of the compressor and the condenser fan.

12. The air-conditioning assembly of claim 11, wherein the temperature sensing assembly is associated with the compressor outlet pipe, and
wherein the control module includes a threshold temperature stored therein and, based on the temperature signal, is configured to determine whether the temperature of the compressor outlet pipe exceeds the preset threshold temperature.

13. The air-conditioning assembly of claim 12, wherein the control module is configured to shut down the compressor when the temperature exceeds the threshold.

14. The air-conditioning assembly of claim 11, wherein the temperature sensing assembly is associated with the condenser outlet pipe, and
wherein the control module includes a threshold temperature stored therein and, based on the temperature signal, is configured to generate a condenser fan control signal to adjust the condenser fan.

15. The air-conditioning assembly of claim 11, wherein the depression is a longitudinal notch.

16. The air-conditioning assembly of claim 11, wherein the sensor further includes a sensor wire adapted to operatively connect the sensor to the control module.

17. The air-conditioning assembly of claim 11, wherein the recess is a concave recess.

18. The air-conditioning assembly of claim 11, wherein the insulator body includes a wire passage extending radially from the inner surface through the insulator body, the wire passage being configured to receive sensor wires, and the probe extending from the wire passage and along the depression to define a bend therebetween.

19. The air-conditioning assembly of claim 18, including a wire seal disposed within the wire passage to seal the temperature sensor from ambient air.

20. The air-conditioning assembly of claim 11, wherein said at least one temperature sensing assembly includes a strap configured to extend around the circumference of the insulator body and said at least one of the compressor and condenser outlet pipes to secure said at least one of the compressor and condenser outlet pipes against the inner surface and in direct contact with the temperature sensor.

21. The air-conditioning assembly of claim 20, wherein the strap is a zip-tie type strap.

22. The air-conditioning assembly of claim 20, wherein the insulator body includes a waist and adjacent portions, the waist having a diameter less than a diameter of the adjacent portions, the strap being disposed about the waist.

23. A method of monitoring a temperature of a pipe to control an air-conditioning assembly, comprising:
maintaining a sensor having a probe protruding from a notch formed in a recess defined by an inner surface formed in an insulator body;
receiving a portion of a circumference of the pipe in the inner surface;
directly contacting the circumference of the pipe with the probe at a contact area;
sealing the contact area from ambient air;
generating a temperature signal indicative of a temperature of the pipe; and
receiving the temperature signal at a control module.

24. The method of claim 23, including:
generating a control signal at the control module based upon the temperature signal; and
communicating the control signal to at least one of a compressor and condenser fan to control said at least one of an air-conditioning compressor and a condenser fan.

25. The method of claim 24, including:
storing a threshold temperature in the control module;
determining whether the temperature of the compressor outlet pipe exceeds the preset threshold temperature.

26. The method of claim 25, including shutting down the compressor when the temperature exceeds the threshold.

27. The method of claim 23, including generating a condenser fan control signal based on the temperature signal; and adjusting a fan speed of a condenser fan.

* * * * *